United States Patent
Hsu

(10) Patent No.: US 7,129,611 B2
(45) Date of Patent: Oct. 31, 2006

(54) METHOD AND RADIAL GAP MACHINE FOR HIGH STRENGTH UNDIFFUSED BRUSHLESS OPERATION

(75) Inventor: John S. Hsu, Oak Ridge, TN (US)

(73) Assignee: UT-Battelle LLC, Oak Ridge, TN (US)

(*) Notice: Subject to any disclaimer, the term of this patent is extended or adjusted under 35 U.S.C. 154(b) by 120 days.

(21) Appl. No.: 10/668,586

(22) Filed: Sep. 23, 2003

(65) Prior Publication Data
US 2004/0232794 A1 Nov. 25, 2004

Related U.S. Application Data

(60) Provisional application No. 60/472,544, filed on May 22, 2003.

(51) Int. Cl.
H02K 1/27 (2006.01)

(52) U.S. Cl. .............. 310/156.56; 310/190; 310/191; 310/181

(58) Field of Classification Search ..............
310/156.56–156.61, 191, 181, 190, 43, 51, 310/216
See application file for complete search history.

(56) References Cited

U.S. PATENT DOCUMENTS

| | | | | |
|---|---|---|---|---|
| 3,411,027 A | * | 11/1968 | Rosenberg | 310/181 |
| 5,191,256 A | * | 3/1993 | Reiter et al. | 310/156.49 |
| 5,397,975 A | * | 3/1995 | Syverson | 322/46 |
| 5,886,445 A | | 3/1999 | Hsu | 310/211 |
| 5,929,579 A | | 7/1999 | Hsu | 318/439 |
| 6,057,622 A | | 5/2000 | Hsu | 310/191 |
| 6,097,124 A | * | 8/2000 | Rao et al. | 310/156.26 |
| 6,441,525 B1 | * | 8/2002 | Koharagi et al. | 310/156.56 |
| 6,573,634 B1 | | 6/2003 | Hsu | 310/266 |
| 6,703,741 B1 | * | 3/2004 | Ifrim | 310/156.19 |
| 2002/0047434 A1 | * | 4/2002 | Koharagi et al. | 310/156.56 |
| 2002/0117907 A1 | * | 8/2002 | Gay et al. | 310/44 |
| 2002/0180297 A1 | * | 12/2002 | Ifrim | 310/168 |
| 2004/0232794 A1 | * | 11/2004 | Hsu | 310/156.56 |
| 2005/0001505 A1 | * | 1/2005 | Hsu | 310/156.56 |

FOREIGN PATENT DOCUMENTS

| EP | 803 962 | * 10/1997 |
|---|---|---|
| JP | 2000-278899 | * 10/2000 |

* cited by examiner

Primary Examiner—Karl Tamai
(74) Attorney, Agent, or Firm—Quarles & Brady LLP

(57) ABSTRACT

A radial gap brushless electric machine (30) having a stator (31) and a rotor (32) and a main air gap (34) also has at least one stationary excitation coil (35a, 36a) separated from the rotor (32) by a secondary air gap (35e, 35f, 36e, 36f) so as to induce a secondary flux in the rotor (32) which controls a resultant flux in the main air gap (34). Permanent magnetic (PM) material (38) is disposed in spaces between the rotor pole portions (39) to inhibit the second flux from leaking from the pole portions (39) prior to reaching the main air gap (34). By selecting the direction of current in the stationary excitation coil (35a, 36a) both flux enhancement and flux weakening are provided for the main air gap (34). A method of non-diffused flux enhancement and flux weakening for a radial gap machine is also disclosed.

17 Claims, 4 Drawing Sheets

METHOD AND RADIAL GAP MACHINE FOR HIGH STRENGTH UNDIFFUSED BRUSHLESS OPERATION

CROSS-REFERENCE TO RELATED APPLICATION

The benefit of priority based on U.S. Provisional Patent Application No. 60/472,544, filed May 22, 2003, is claimed herein.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both AC and DC machines, including both motors and generators, and including induction machines, permanent magnet (PM) machines and switched reluctance machines.

DESCRIPTION OF THE BACKGROUND ART

There are three major types of brushless electric machines available for the electric vehicle (HV) and hybrid electric vehicle (HEV) drive systems. These are the induction machine, the PM machine, and the switched-reluctance machine.

Permanent magnet (PM) machines have been recognized for having a high power density characteristic. A PM rotor does not generate copper losses. One drawback of the PM motor for the above-mentioned application is that the air gap flux produced by the PM rotor is limited, and therefore, a sophisticated approach is required for high speed, field weakening operation. Another constraint is that inductance is low, which means that current ripple must be controlled.

It is understood by those skilled in the art that a PM electric machine has the property of high efficiency and high power density, however, the air gap flux density of a PM machine is limited by the PM material, which is normally about 0.8 Teslas and below. A PM machine cannot operate at an air gap flux density as high as that of a switched reluctance machine. When the PM motor needs to have a weaker field with a reasonably good current waveform for high-speed operation, a sophisticated power electronics inverter is required.

Hsu, U.S. Pat. No. 6,573,634, issued Jun. 3, 2003, and entitled "Method and Machine for High Strength Undiffused Brushless Operation" discloses and claims an axial gap PM machine for higher strength, undiffused operation.

In many applications, a radial gap machine is preferred. When considering a radial gap configuration for undiffused, high strength operation, several problems have to be overcome. It is desirable to provide a compact design with a shape similar to a conventional radial gap machine. It is also not apparent how to arrange the PM material so as to control diffusion between poles of opposite polarity. It is also not apparent how to design the auxiliary field coils so as to complete a magnetic circuit through the rotor.

In order to overcome the above problems, the invention provides a novel machine described below.

SUMMARY OF THE INVENTION

This invention provides a radial gap high strength PM machine and method for undiffused operation.

The invention is incorporated in a brushless electric machine with a stator and with a rotor spaced from the stator to define a radial air gap relative to an axis of rotation for the rotor. The rotor has pairs of rotor pole portions of opposite polarity with extensions projecting toward an axially disposed secondary air gap. At least one, and preferably two, stationary excitation coils are provided for receiving direct current from an external source. These coils are positioned across the secondary air gaps, so as to induce a secondary component of flux in the rotor which increases a resultant flux in the radial air gap when the direct current is of a first polarity and which reduces resultant flux in the radial air gap when said direct current is of a second polarity opposite the first polarity. PM material with a suitable polarity is disposed between the rotor pole portions for conveying the secondary component of flux to or from the radial air gap and for inhibiting the secondary flux from leaking from said pole portions prior to reaching the radial air gap.

The invention provides stationary auxiliary field windings and avoids the use of any rotating windings.

The invention is applicable to both AC and DC machines, and to both motors and generators.

The invention is also practiced in a method of controlling flux in a brushless electrical machine having a stator with a stationary, primary excitation winding and a rotor separated by a main air gap, with the rotor having a portion facing the main air gap. The method comprises inducing a first flux in the rotor from the stator across the main air gap; passing a direct current through a stationary coil; positioning said stationary coil so as to induce a second flux in the rotor from a position separated from the main air gap by at least a portion of the rotor; and providing portions of PM material at least partly around said portions of the rotor separating the coil from the main air gap so as to prevent leakage of the second flux induced in the rotor before reaching the main air gap.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1A:
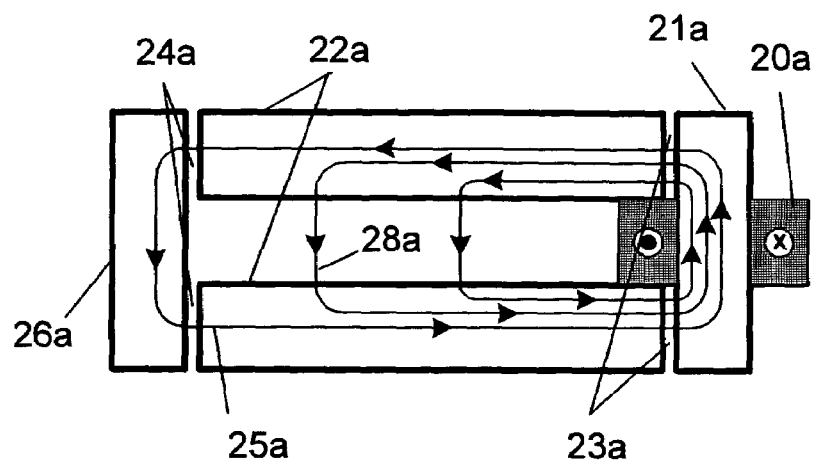
FIGS. 1a–1c are schematic diagrams of a simplified stator and rotor apparatus showing three states of operation: a) diffused flux, b) enhanced air main gap flux with the addition of PM material and c) reversed excitation for field weakening operation.
Figure 1B:
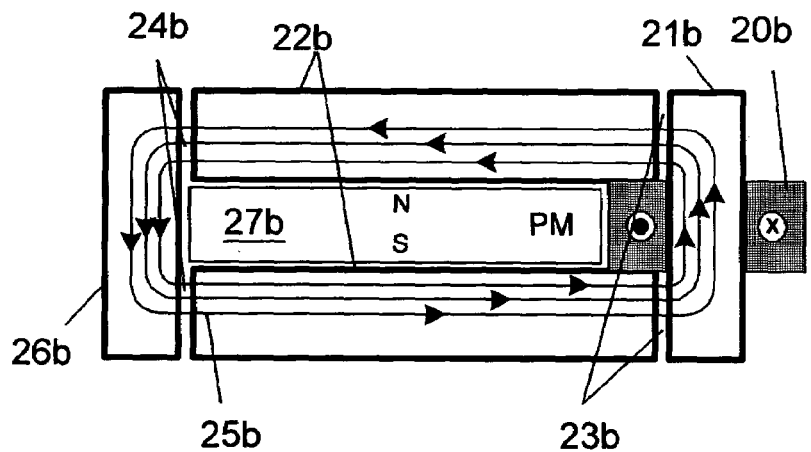
Figure 1C:
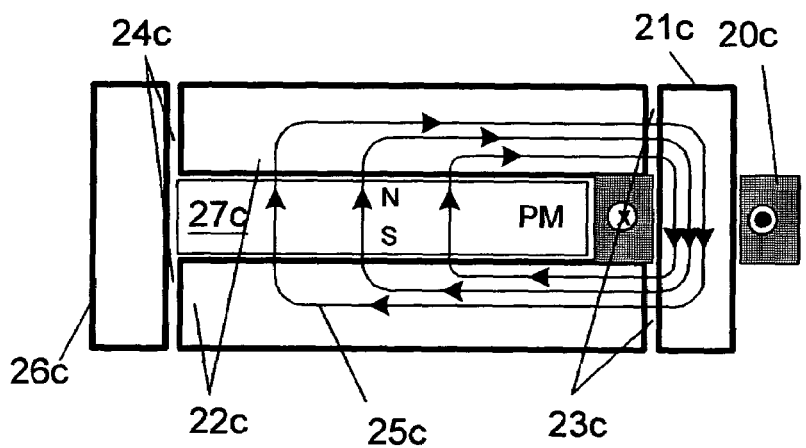

FIG. 1a–1c illustrate a simplified stator and rotor apparatus showing three states of operation for a motor according to the present invention: a) diffused flux, b) enhancement of main air gap flux with the addition of PM material and c) reversed excitation for reducing flux in the air gap in a field weakening operation. It should be noted that only a portion of the desired PM material has been represented in FIGS. 1b and 1c, with it being understood that additional material can be added according to the following description.

The main air gap flux density of a PM machine can be increased or weakened with an additional excitation coil 20a–20c, as seen in FIGS. 1a–1c. These diagrams also illustrate how PM material will inhibit flux diffusion.

FIG. 1a shows the flux components 25a traveling through the iron core 22a of the rotor, the iron core of the stator 26a, the main air gap 24a on the left-hand side, and the excitation coil 20a supported on an additional stator iron core 21a providing a secondary air gap 23a on the right hand side of the rotor 22a. When the current flows in the excitation coil 20a, magnetic fluxes are produced in the iron cores 21a, 22a, 26a. The main air gap flux 25a is not the total flux produced by the coil 20a. A significant portion of the flux is shown as the diffused flux 28a which passes between pole portions 22a of the rotor core.

FIG. 1b shows that in order to enhance the main air gap flux 25b, PM material 27b with an N-S polarity as shown, is placed between the upper and lower pole pieces 22b of the rotor. The PM material 22b in the rotor produces flux in the main air gap 24b and also inhibits magnetic flux diffusion between the poles 22b. Thus, it enhances the usable main air gap flux density.

FIG. 1c shows that by reversing the direction or polarity of the current in the excitation coil 20c, the main air gap flux is weakened by removing the component provided by coil 20c. This provides a field weakening feature in the main air gap 24c of the machine of the present invention.

For a conventional PM machine the air-gap flux density is about 0.6 to 0.8 Teslas and cannot be weakened without the aid of some sophisticated power electronics. Both the stationary excitation coil and the PM material in the rotor maximize rotor flux in the PM machine of the present invention. It can produce two to three times the air gap flux density of a conventional PM machine. Because the torque produced by an electric machine is directly proportional to the air gap flux density, a higher torque, more powerful machine is provided with only small additions to size and weight.

Figure 2:
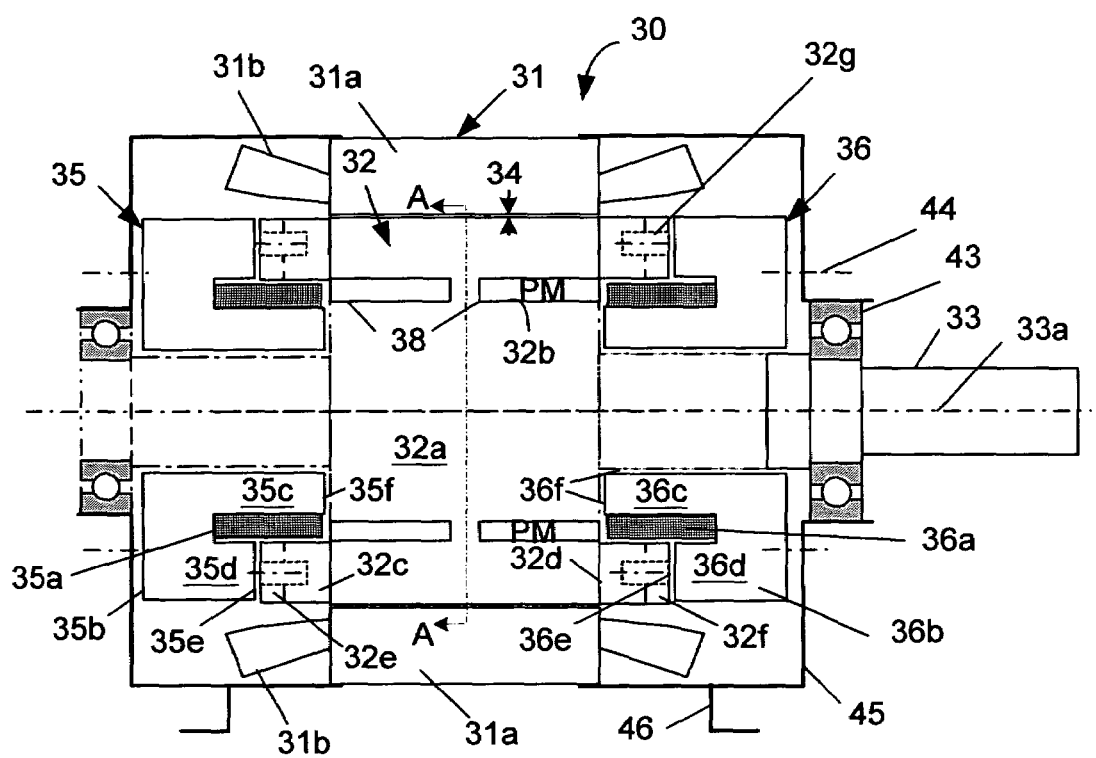
FIG. 2 is a longitudinal section view of a machine of the present invention incorporating the operating principles illustrated in FIGS. 1a–1c.

FIG. 2 shows a side view of an end excitation, radial gap, high strength undiffused machine 30. The overall shape is similar to a conventional induction machine. The stator laminated core 31a and windings 31b are identical to those of a conventional AC machine. The rotor 32 of this end excitation, radial gap, machine 30 is preferably made of solid steel with the option of having slits 32s along the axial direction for reducing the slot harmonics losses. In other embodiments, the core portions 31a, 32a of the stator 31 and the rotor 32 can be made of iron, one of many suitable steels or another iron alloy. The stator and rotor 31, 32 are separated by a radial air are separated by a radial air gap 34, which is a radial distance from an axis of rotation 33a for the rotor 32. When phase currents energize the polyphase windings 31b, they produce a rotating magnetic flux wave in the main air gap 34.

At each end of the rotor 32 is a secondary DC excitation assembly 35, 36 including a stationary, ring-shaped excitation core 35b, 36b and a multi-coil winding 35a, 36a for receiving direct current from an external source. This current can be of a first polarity illustrated in FIG. 1b, or of a second polarity as illustrated in FIG. 1c. The rings 35b, 36b encircle the rotor shaft 33 and have two projecting portions 35c, 35d, 36c, 36d to provide air gaps 35e, 35f, 36e and 36f. A stationary toroidal excitation coil 35a, 35b fits in an annular recess in each excitation core 35b, 36b. The cores 35a, 36a are mounted to a machine housing 45 using bolts 44 represented by centerlines in FIG. 2.

Figure 4:
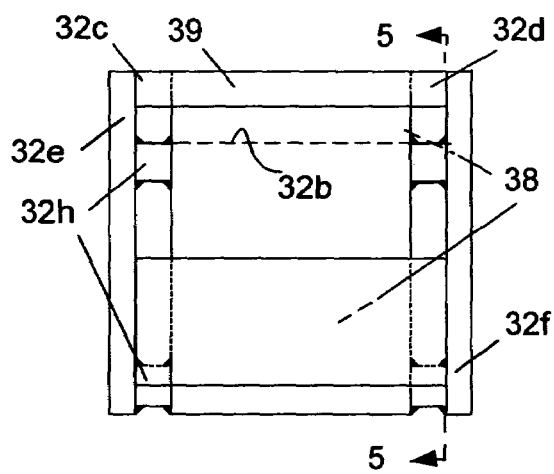
FIG. 4 is a side elevational view of the rotor seen in FIG. 2.

Referring to FIGS. 2 and 4, steel pole pieces 32c, 32d extend from the rotor 32 on opposite ends and are fastened to steel rings 32e, 32f at the ends by pins or by other suitable fasteners. As seen in FIG. 2, the magnetic flux in the steel pole pieces 32c, 32d is axially conducted to the steel rings 32e, 32f and passes through to the stationary excitation cores 35b, 36b, through air gaps 35e, 36e. The rotating steel rings 32e, 32f conduct the flux back to the steel rotor body 32a by crossing another set of end gaps 35f, 36f. These end magnetic paths through the rotating excitation rings 32e, 32f are controlled by the current in the stationary toroidal excitation coils 35a, 36a located inside the stationary excitation cores 35b, 36b.

Figure 3:
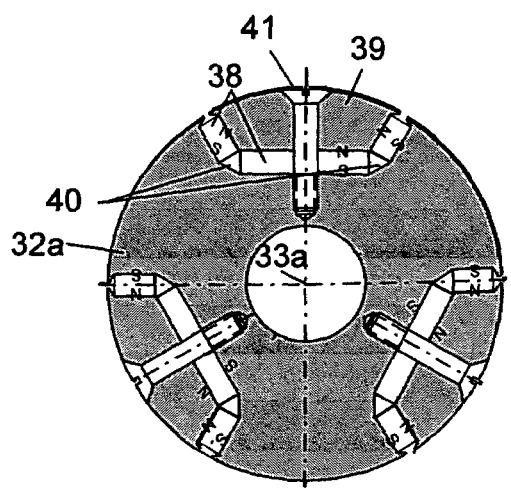
FIG. 3 is transverse sectional view taken in a plane indicated by line 3—3 in FIG. 2.
Figure 5:
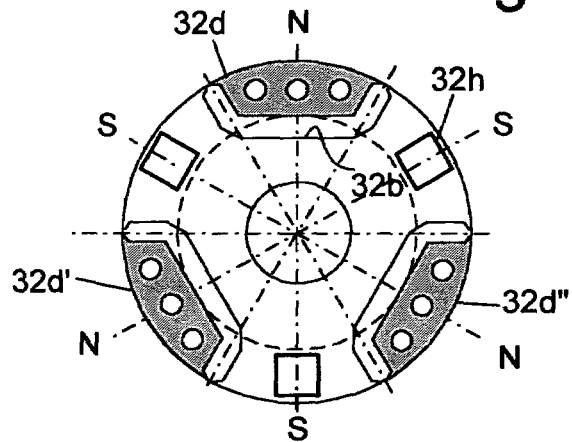
FIG. 5 is a transverse sectional view of the rotor taken in a plane indicated by line 5—5 in FIG. 4.
Figure 5A:
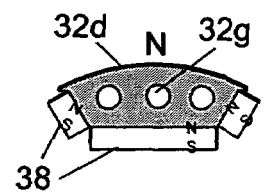
FIG. 5a is a detail view of a portion in FIG. 5.

Referring to FIGS. 3 and 5, permanent magnets (PM) 38 having N and S polarity as shown, are sandwiched between the steel pole pieces 39 and the steel rotor body 32a. The PMs can be the preformed pieces or the injected type. The rotor 32 has a body portion 32a that is cylindrical except for longitudinally extending grooves 32b (FIG. 4), wherein PM material 38 is positioned in the grooves 32b. Pole pieces 39 are positioned in the grooves 32b over the PM material 38 to form a cylindrical rotor 32 with poles of alternating north (N) and south (S) polarity separated by PM material 38 (FIGS. 5, 5a). Between pieces of PM material 38, an epoxy material 40 (FIG. 3) can be used to fill gaps. The pole pieces 39 are held in place by non-magnetic stainless steel screws 41 (FIG. 3).

Referring to FIG. 5, the PM material 38 produces the north and south poles on the side of the exterior of rotor 32 that faces the stator 31 and the radial air gap 34 (FIG. 2). Subsequently, the radial air gap 34 (FIG. 2) receives the secondary flux from the rotor 32, which interacts with the primary flux induced by the stator windings 31b to produce a resultant flux. This resultant flux in the radial air gap 34 can be either enhanced or weakened by the DC excitation in the excitation assemblies 35, 36 (FIG. 2) that face the ends the rotor 32.

During the enhancement of air gap flux (previously described in relation to FIG. 1b) the PM material 38 in the rotor 32 tends to prevent the diffusion of flux between the rotor poles (FIGS. 3, 5) More flux is guided to the main air gap 34 (FIG. 2) to interact with the stator-induced flux.

During field weakening operation (previously described in relation to FIG. 1c) a great portion of the main air gap flux is drawn away from the air gap 34 by controlling the DC current in the DC excitation winding 35, 36. The dragging torque is greatly reduced by a lower flux density in the main air gap 34 between the stator 31 and the rotor 32.

FIG. 2 also shows that the rotor 32 is mounted on a shaft 33 which is supported for rotation in bearings 43 around axis of rotation 33a. The stator 31, the rotor 32 and the excitation assemblies 35, 36 are enclosed in motor housing 45, which is supported on supports 46. It is noted that FIG. 2 sectional view shows that two of the north poles are provided at the top and bottom of the rotor 32. FIG. 2 could be considered an offset sectional view of a six-pole machine shown in FIGS. 3–6 or would also be illustrative of machines with four and higher numbers of poles according to the invention.

FIGS. 4, 5, 5a, 6 and 6a show details of the rotor pole extensions 32c, 32d and the rotor end rings 32e, 32f for a six-pole machine. The extensions 32c, 32d are made of ferromagnetic steel material. The extensions 32d, 32d', 32d" (FIG. 5), which correspond to the north poles, are spaced 120 degrees apart and there are three such extensions, 32d, 32d', and 32d". The extensions project beyond the PM material 38 as seen in FIG. 2. Alternating with the rotor extensions, as seen in FIG. 5, are non-magnetic stainless steel mounting blocks 32h which are welded to the rotor body 32a and to the rotor end rings 32e, 32f. Fasteners (not shown) may also be inserted through the rings 32e, 32f, into the blocks 32h. The pins (not shown) for fastening the rings 32e, 32f to the pole pieces 39 are ferromagnetic steel materials which are inserted with a force fit into holes (not shown) in the rings 32e, 32f and holes 32g (FIG. 5a) in the pole piece extensions 32d.

Figure 6:
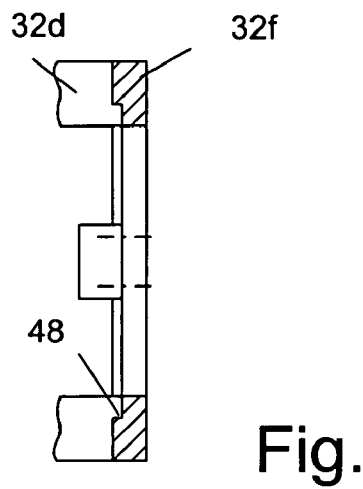
FIG. 6 is a detail view of another portion of the rotor assembly seen in FIG. 4.
Figure 6A:
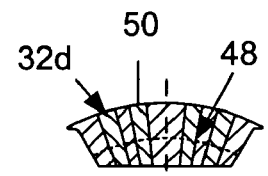
FIG. 6a is a detail of further aspect of a pole piece portion of the parts seen in FIG. 6.

FIGS. 6 and 6a show a detail wherein stepped flanges 48 can be provided on the end rings 32f to mate with stepped ends of the pole piece extensions 32d to make a sturdier connection for withstanding rotational forces during motor operation. As seen in FIG. 6a, the pole pieces 32d can be made of a plurality of thin pieces 48 held together to reduce core loss due to stator slot harmonics. The rotor pole extensions 32c, 32d can also be of a skewed configuration, of a type known in the art, to align with offset stator slots, to counteract harmonic torque reduction.

Figure 7:
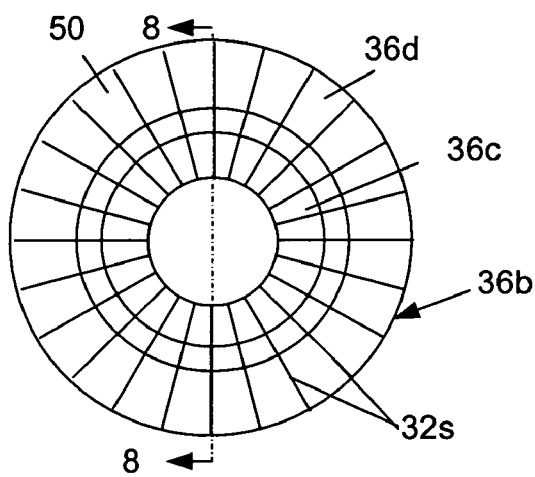
FIGS. 7–10 are end views and section views of two cores used in the auxiliary winding assemblies seen in FIG. 2.
Figure 8:
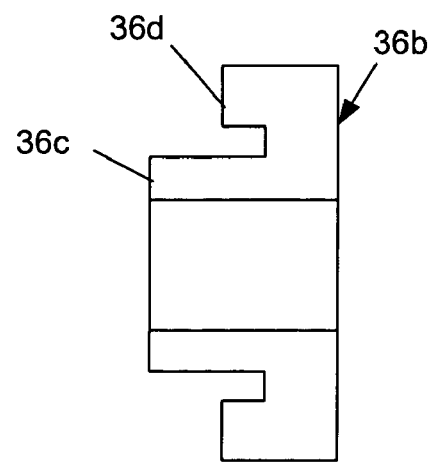
Figure 9:
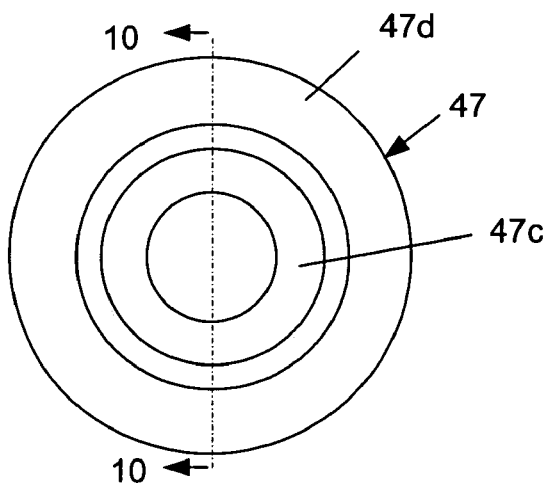
Figure 10:
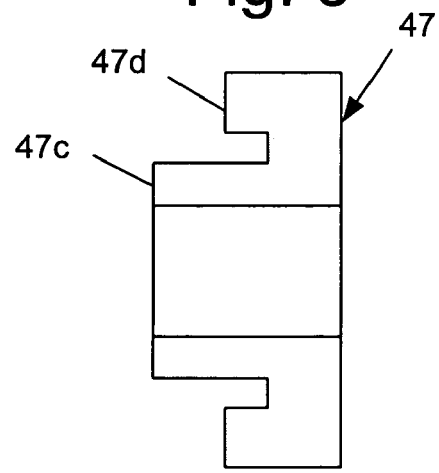

The excitation cores 35b, 36b can be made from different types of material, such as solid steel, or thin pieces of steel 50 (FIGS. 7 and 8). These cores 35b, 36b will not be subjected to torque, so many types of suitable bonding materials may be utilized to bond the thin pieces of steel 50. Another variation involves forming an excitation core 47 from a compressed powder having ferromagnetic properties (FIGS. 9 and 10). This aids in reducing losses in the core 47. The powdered cores 47 have features 47c, 47d corresponding to like features on the cores 36b.

The invention provides a high strength undiffused brushless machine. The DC flux produced by the excitation coils 35b, 36b (FIG. 2) flows to or from the north and south poles of the rotor 32 through the air gaps 35e, 36e, 35f, 36f without the use of brushes. The DC flux in the rotor 32 is guided to the north and south pole portion on the circumference of the rotor 32 to interact with the armature flux in the main air gap 34. The undiffused arrangement provided by PM elements 38 guides the flux to the main air gap 34 facing the stator. Both the PM elements and the excitation coils 35b, 36b enhance the air-gap flux density. Consequently, a high air-gap torque for a given stator current can be obtained. By controlling the direction of the current in the additional stator excitation coils 35b, 36b, the main air-gap flux can be weakened, when desired. This motor requires only a simple power electronics drive of a type known in the art, which lowers the overall cost of a system using this machine.

The invention is applicable to both AC synchronous and DC brushless machines and to both motors and generators.

This has been a description of the preferred embodiments of the invention. The present invention is intended to encompass additional embodiments including modifications to the details described above which would nevertheless come within the scope of the following claims.

I claim:

1. A brushless electric machine comprising:
a stator and a rotor spaced from the stator to define a radial air gap relative to an axis of rotation for the rotor;
a rotor having an axis of rotation and having pairs of rotor pole portions of opposite polarity disposed at least partly around a circumference of the rotor and having axially projecting extensions projecting from at least one end of the rotor toward a secondary air gap;
at least one stationary excitation coil assembly for receiving direct current from an external source and being positioned across the secondary air gap so as to induce a component of flux in the rotor pole portions which increases a resultant flux in the radial air gap when said direct current is of a first polarity and which reduces resultant flux in the radial air gap when said direct current is of a second polarity opposite said first polarity; and
wherein permanent magnet (PM) material is disposed between the rotor pole portions and is also disposed between rotor pole portions of one polarity and a core portion of the rotor for containing the component of flux in the rotor pole portions as the component of flux is conveyed to the radial air gap and for inhibiting the component of flux from leaking from said pole portions prior to reaching the radial air gap when said direct current is of the first polarity;
further comprising pole extensions extending from said at least one end of the rotor and an end ring attached to said pole extensions to provide a magnetic path to the secondary air gap, and said end rings have pole pieces corresponding to said pole extensions; and
wherein said pole pieces have stepped flanges for connecting to the pole extensions and wherein the flanges are made of a plurality of stacked laminations.

2. The machine of claim 1, further comprising a second stationary excitation coil assembly for receiving direct current from an external source and being positioned across a second secondary air gap from said rotor.

3. The machine of claim 2, wherein each stationary, excitation coil assembly includes a coil supported by a core that is made of iron, steel or another iron alloy.

4. The machine of claim 2, wherein each stationary, excitation coil assembly includes a coil supported by a core that is made of a compressed powder material having ferromagnetic properties.

5. The machine of claim 1, wherein said rotor has a body portion that is cylindrical except for longitudinally extending grooves, wherein PM material is disposed in said grooves and wherein pole pieces are disposed in said grooves over the PM material to form a cylindrical rotor with axially extending poles of alternating polarity on a rotor circumference that are separated by PM material; and
wherein the direct current component of flux is initially conveyed axially through the pole pieces before being conveyed to the radial air gap.

6. The machine of claim 5, wherein said rotor body portion has slits along an axial direction for reducing harmonics losses.

7. The machine of claim 1, wherein the machine is brushless AC synchronous machine.

8. The machine of claim 1, wherein the machine is a brushless DC machine.

9. The machine of claim 1, wherein the machine is a motor.

10. The machine of claim 1, wherein the machine is a generator.

11. A method of controlling flux in a brushless electrical machine, the method comprising:
  inducing a first flux in a rotor from a stator across a radial air gap by conducting a current in a primary excitation winding on the stator;
  positioning a first excitation coil at one end of the rotor;
  conducting a direct current through the first excitation coil so as to produce a second flux in the rotor across at least one axial air gap and to produce a resultant flux in radial air gap resulting from the first flux and the second flux;
  providing portions of permanent magnet (PM) material between poles in the rotor and between poles of one polarity and a core portion of the rotor, which is of generally cylindrical shape, so as to contain the second flux as said second flux is conveyed to the radial air gap and to prevent leakage of the second flux in the rotor before reaching the radial air gap;
  conducting a direct current of a first polarity through the first excitation coil, so as to increase resultant flux in the radial air gap;
  conducting a direct current of a second polarity through the first excitation coil so as to weaken resultant flux in the radial air gap;
  providing pole extensions extending from at least said one end of the rotor;
  attaching an end ring to said pole extensions to provide a magnetic path to the axial air gap; and
  wherein said end rings have pole pieces corresponding to said pole extensions, said poles pieces having stepped flanges for connecting to the pole extensions in a manner to withstand rotational forces encountered during operation of the machine.

12. The method of claim 11, further comprising forming the flanges with a plurality of stacked laminations.

13. The method of claim 11, wherein said second flux has a first component that is controlled in the rotor by current in the first excitation coil and further comprising conducting a direct current through a second excitation coil at an opposite end of the rotor from the first excitation coil, so as to induce a second component of said second flux across a second axial air gap.

14. The method of claim 11, wherein the machine is operated as a brushless AC synchronous machine.

15. The method of claim 11, wherein the machine is operated as a brushless DC machine.

16. The method of claim 11, wherein the machine is operated as a motor.

17. The method of claim 11, wherein the machine is operated as a generator.

* * * * *